United States Patent [19]
Aoki

[11] Patent Number: 5,736,042
[45] Date of Patent: Apr. 7, 1998

[54] CONICAL FILTER HAVING BONDED END FLAPS

[75] Inventor: Tsuneo Aoki, Iyomishima, Japan

[73] Assignee: Kabushiki Kaisha Tokiwa Kogyo, Ehime, Japan

[21] Appl. No.: 596,093

[22] PCT Filed: Dec. 14, 1994

[86] PCT No.: PCT/JP94/02127

§ 371 Date: Jan. 31, 1996

§ 102(e) Date: Jan. 31, 1996

[87] PCT Pub. No.: WO96/18332

PCT Pub. Date: Jun. 20, 1996

[51] Int. Cl.⁶ .................................................. B01D 29/085
[52] U.S. Cl. .................. 210/474; 210/497.2; 210/497.3; 99/295; 426/77; 426/82
[58] Field of Search .................. 210/473, 474, 210/477, 497.3, 497.2; 426/77, 82; 99/295

[56] References Cited

U.S. PATENT DOCUMENTS

| | | | |
|---|---|---|---|
| 1,889,845 | 12/1932 | Rundquist | 210/497.3 |
| 3,437,540 | 4/1969 | Welin-Berger | 210/477 |
| 3,616,934 | 11/1971 | Ehrlich | 210/474 |
| 4,220,541 | 9/1980 | Chang | 210/474 |
| 5,059,325 | 10/1991 | Iida | 210/474 |

FOREIGN PATENT DOCUMENTS

| | | |
|---|---|---|
| 2-12327 | 1/1990 | Japan . |
| 3-3934 | 1/1991 | Japan . |
| 4-102932 | 9/1992 | Japan . |

*Primary Examiner*—W. L. Walker
*Attorney, Agent, or Firm*—Lowe, Price, LeBlanc & Becker

[57] ABSTRACT

Primarily a pair of substantially fan-shaped filter sheets are laid one upon another and bonded to each other at least in the proximity of their side edges to obtain a basic filter 4 adapted to form a bag having a circular opening as arc-shaped outer edges 24A, 24B of these filter sheets, wherein a pair of substantially crescent-shaped flap sheets 6 are bonded along their arc-shaped edges to said basic filter 4 along their arc-shaped outer edges 24A, 24B to obtain a filter 1 provided with a pair of pockets 8 openable downwardly of the filter 1.

8 Claims, 5 Drawing Sheets

CONICAL FILTER HAVING BONDED END FLAPS

FIELD OF THE INVENTION

The present invention relates to a filter particularly suitable to make coffee or tea.

BACKGROUND ART

A conventional disposable filter used to make a cup of coffee comprises a pair of substantially fan-shaped filter sheets laid one upon another and bonded to each other along their opposite side edges as well as along their bottom edges so as to form a bag in an inverted cone-shape as their arc-shaped free edges are spaced from each other. Such a bag is usually received by a substantially similar shaped cup used in combination with such a filter. Then, a desired quantity of coffee powder is introduced into the bag and hot water is poured onto the coffee powder so that coffee drips to the cup bottom.

When the known filter is used to make coffee, a quantity of coffee soaking out through a peripheral wall of the filter inevitably flows along an inner wall of the foresaid cup used in combination with the filter down to the bottom of this cup. However, coffee is sometimes unacceptably cooled by contact with this cup and must be reheated by a coffee server. This reheating is troublesome task.

Accordingly, it is a principal object of the invention to solve the foresaid problem by forming a pair of pockets adjacent the opening of the inverted cone-shaped filter allowing a separately prepared hanger to be assembled in the filter.

SUMMARY OF THE INVENTION

The object see forth above is achieved, according to the invention, by an improved filter comprising a pair of filter sheets being substantially identical in shape and in size, each of the filter sheets having a pair of side edges diverging upward and arc-shaped end edges extending between ends of the side edges so as substantially to define a fan-shape, the pair of filter sheets being laid one upon another and bonded to each other at least in the proximity of the side edges so that the arc-shaped end edges may form a circular opening as the filter sheets are spaced from each other, wherein substantially crescent-shaped flap sheets are bonded along their arc-shaped upper end edges to form a pair of pockets openable downward from the upper end edges.

DESCRIPTION OF THE MOST PREFERRED EMBODIMENT

Details of a filter according to the invention will be described in reference with the accompanying drawings.

Figure 1:
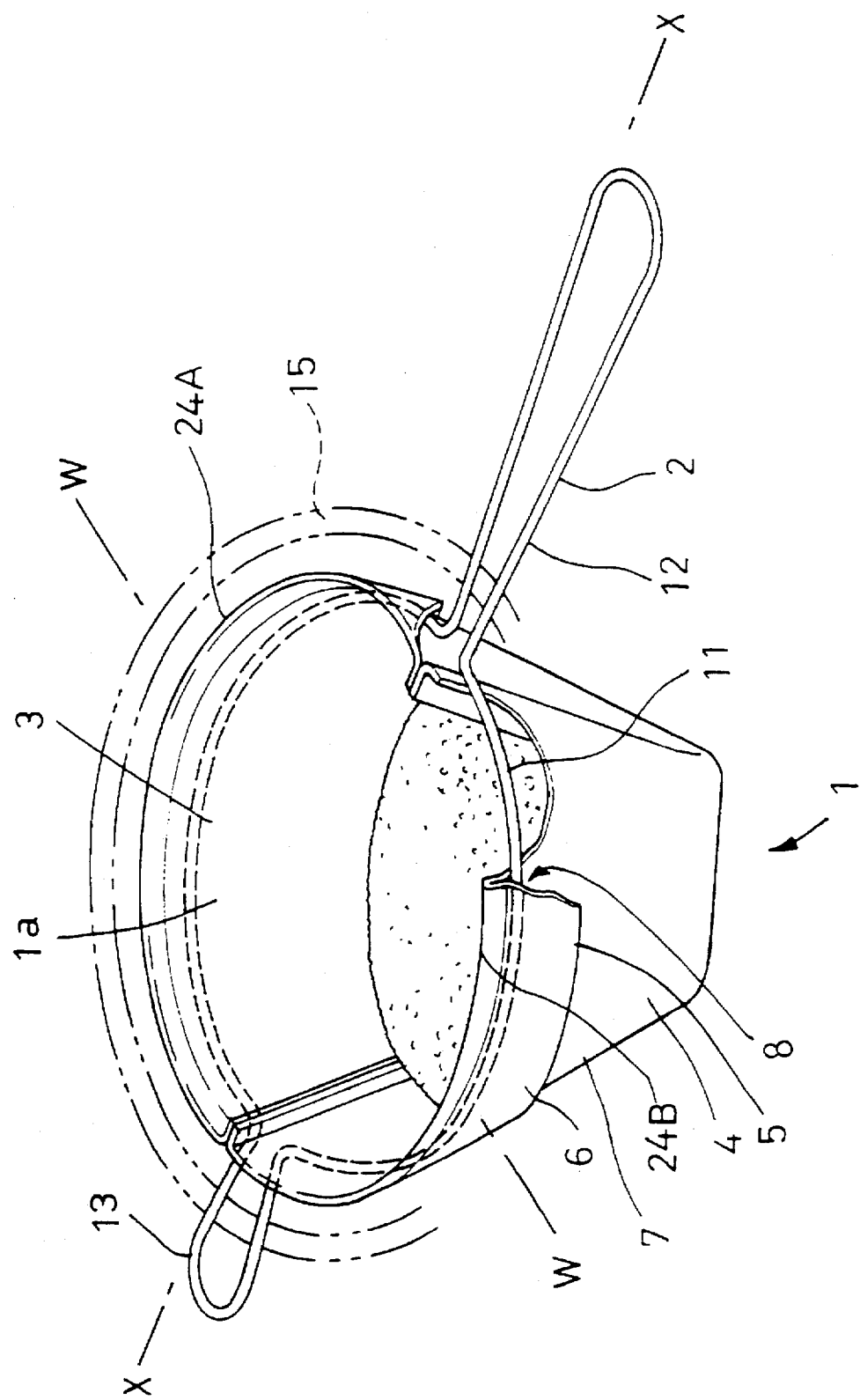
FIG. 1 is a perspective view showing a filter according to the invention as being actually used.
Figure 2:
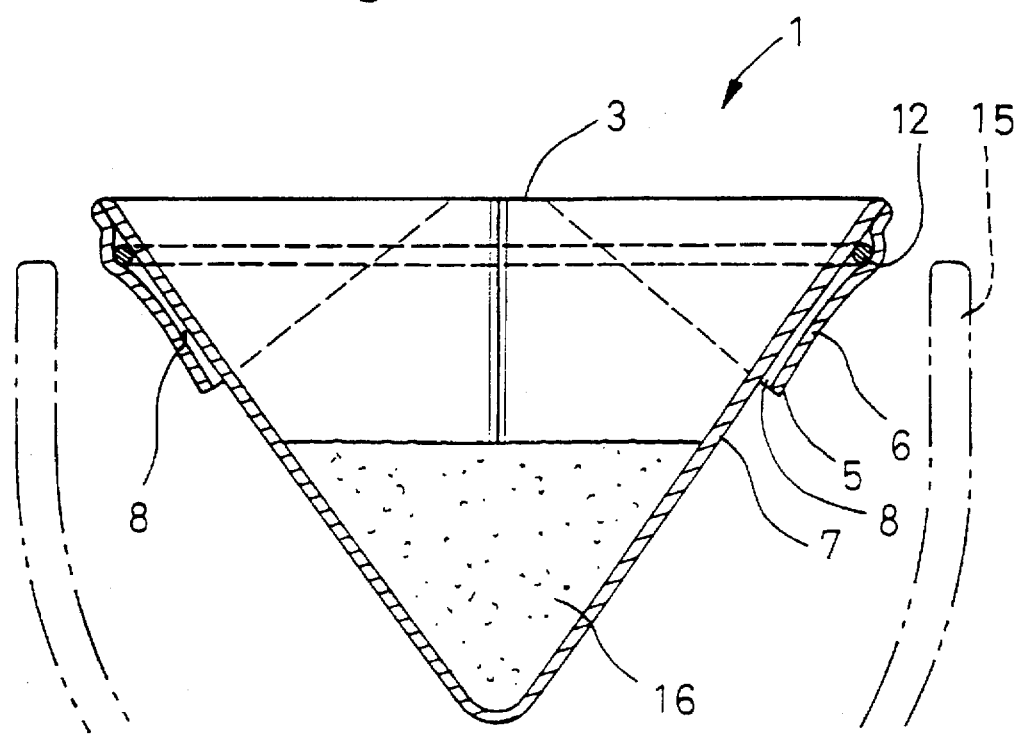
FIG. 2 is a sectional view taken along a line W—W in FIG. 1.
Figure 3:
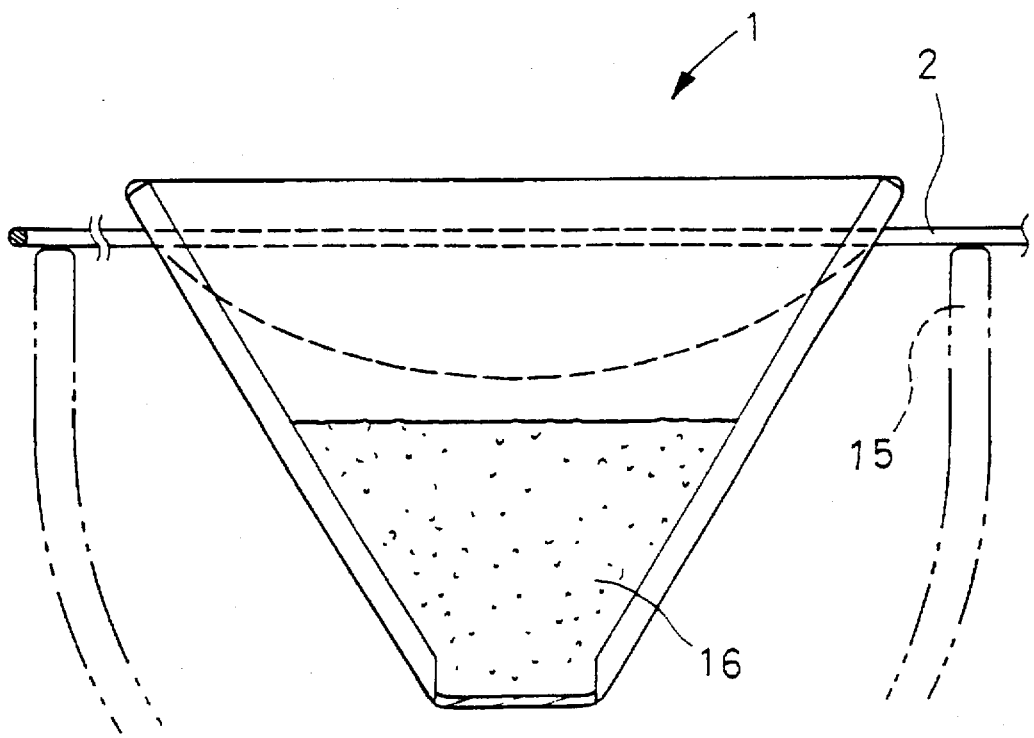
FIG. 3 is a sectional view taken along a line X—X in FIG. 1.

FIGS. 1, 2 and 3 respectively show a filter 1 in a perspective view as being actually used, and in sectional views taken along lines W—W and X—X, respectively. Referring to FIG. 1, the filter 1 is shown as hung on a hanger 2. The filter 1 is shaped in an inverted triangle as viewed in the sectional view taken along the line W—W and shaped in a trapezoid having its bottom side being shorter than its top side, and comprises a filter body 4 with its top side forming a circular opening 3 and flap sheets 6 each having an upper portion bonded the filter body 4 along a partial peripheral edge of the opening 3 and a lower portion defining a free edge 5 so that a pocket 8 opening downwardly of the filter 1 may be formed between a peripheral wall of the filter body 4 and the respective flap sheets 6. The hanger 2 is made of stainless steel wire rod and comprises an annular portion 11, a grip portion 12 formed by a part of the annular portion 11 extending outward, and a stopper portion 13 extending outward from the annular portion 11 in the direction opposite to that in which the grip portion 12 extends. FIG. 1 shows the grip portion 12 and the stopper portion 13 placed on an edge of a coffee cup 15 indicated by an imaginary line. Coffee powder 16 is introduced into a space defined by the filter 1 through the opening 3 and then an appropriate quantity of hot water is poured onto the coffee powder. Consequently, coffee drips into the cup 15.

Figure 4:
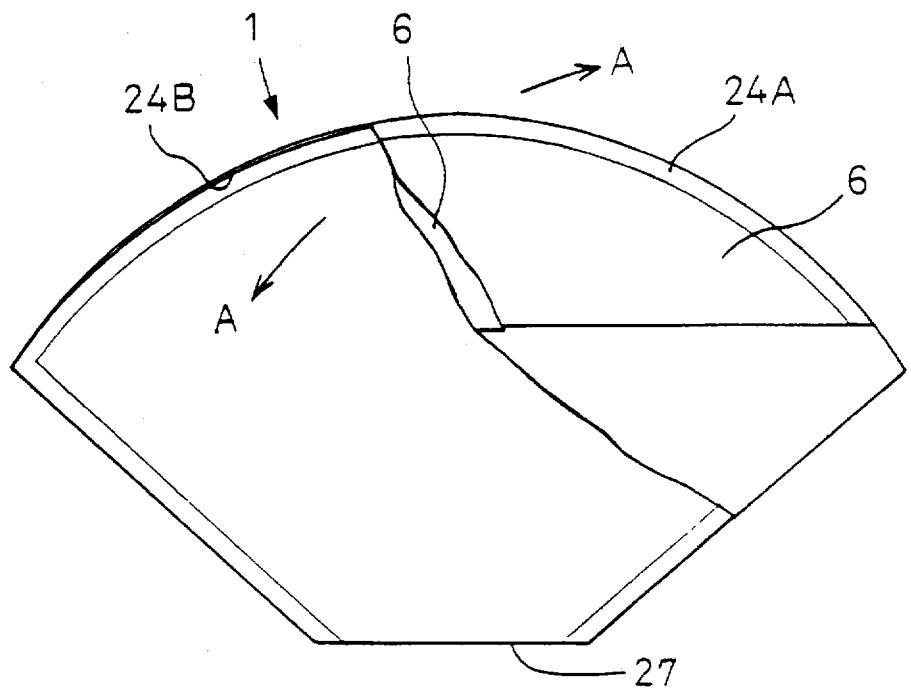
FIG. 4 is a plan view of the filter as partially broken away.
Figure 5:
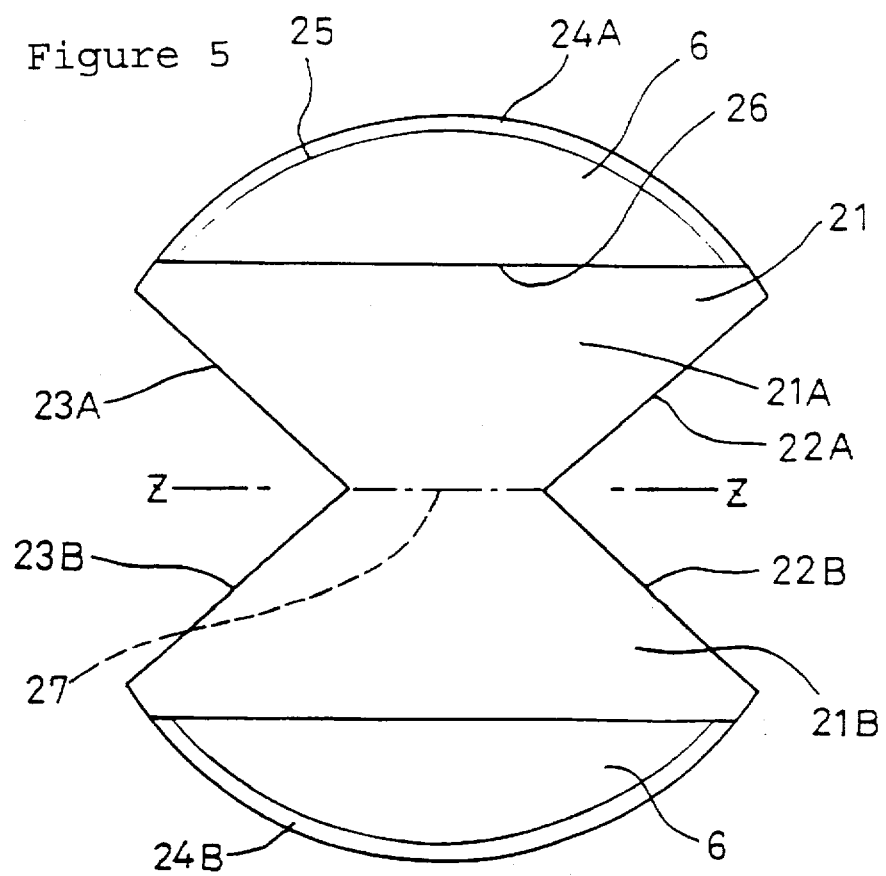
FIG. 5 is a plan view showing the filter of FIG. 4 as having been developed.

FIGS. 4 and 5 are a plan view of the filter 1 as partially broken away and a plan view showing an original filter sheet 21 and the flap sheets 6 in a state after the filter 1 has been developed, respectively. The original filter sheet 21 comprises a pair of substantially fan-shaped sections 21A, 21B which are vertically symmetric with respect to a center line Z—Z, the sections 21A, 21B being respectively defined by side edges 22A, 23A and 22B, 23B progressively diverging from each other, respectively, as they become more distant from the center line Z—Z, and arc-shaped upper end edges am:tending between ends of the side edges 22A and 23A and between ends of the side edges 22B and 23B, respectively. Between a lower end edge of the side edges 22A, 22B and a lower end edge of the side edges 23A, 23B, the center line Z—Z defines a fold line 27 as will be described later. The flap sheets 6 are substantially crescent-shaped having their arcs 25 bonded along their outer edges 24A, 24B to the associated fan-shaped sections 21A, 21B, respectively, and their chords 26 remaining free so that the original filter sheet 21 may cooperate with the respective flap sheets 6 to form the pockets 8 opening toward the center line Z—Z. The original filter sheet 21 is folded along the fold line 27 in two with the flap sheets 6 lying inside and these two halves are inseparably bonded to each other in the proximity of the side edges 22A, 22B and 23A, 23B lying one upon another, respectively, and thereby the filter 1 of FIG. 4 is obtained.

Figure 6:
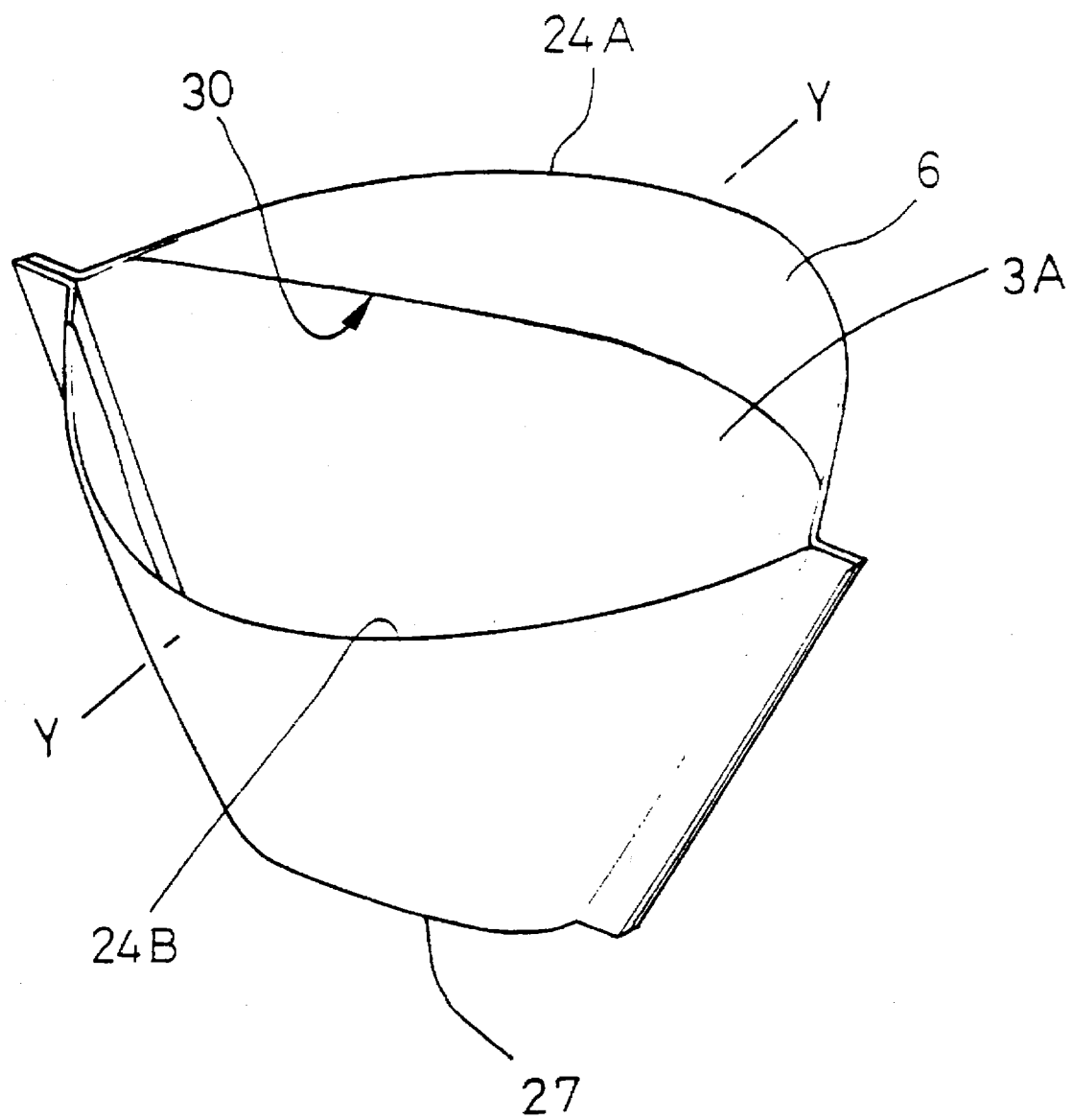
FIG. 6 is a perspective view showing the filter of FIG. 4 as forming an opening.
Figure 7:
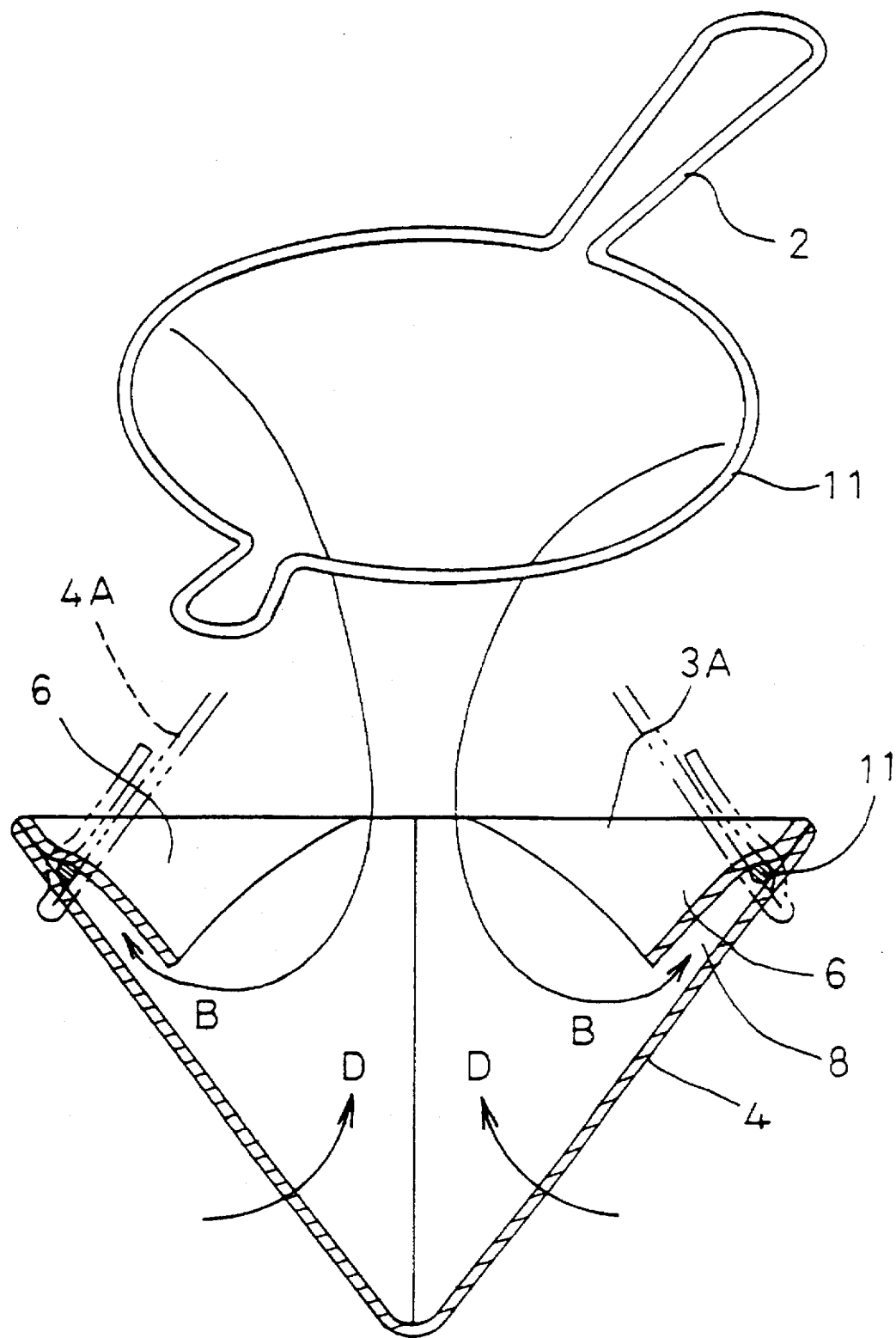
FIG. 7 is a sectional view taken along a line Y—Y in FIG. 6.

FIGS. 6 and 7 show the filter 1 with the outer edges 24A, 24B spaced from each other to form the opening 3A in a perspective view and in a sectional view taken along a line Y—Y, respectively. It should be understood that FIG. 7 includes also a perspective view of the hanger 2 in combination with the perspective view of the filter 1 for better understanding of the manner in which the hanger 2 is assembled into the filter 1. The outer edges 24A, 24B of the filter 1 shown by FIG. 4 as being in a flat state may be spaced from each other in a direction as indicated by arrows A to form a bag having a pair of end surfaces each shaped in an inverted triangle and the pockets 8 defined between the filter body 4 and the respective flap sheets 6 so as to open downwardly. The other pair of end surfaces which are orthogonal to the line Y—Y and containing the center line Z—Z (See FIG. 5) are shaped in trapezoids having their bottom sides defined by the fold line 22.

In actual use of the filter 1, the annular portion 11 of the hanger 2 is inserted into the pockets 8 through the opening 3A in a direction as indicated by arrows B, as shown by FIG. 7. Then, the bottom of the filter body 4 is forced up in the direction indicated by arrows D beyond a plane defined by the opening 3A as shown by imaginary lines 4A to turn the filter 1 over. The filter 1 is then in the state as shown by FIGS. 1 and 2 but this is an upside down state which is unsuitable for immediately use. To be ready for use, the manner of holding the hanger 2 is changed so as to make the opening 3A overlie the remainder. The opening before turning over is designated by reference numeral 3A and the opening after turning over is designated by 3. Once the pockets 8 have been formed outside the filter 1 as a result of the turning over, the filter body 4 and the respective flap sheets 6 are relatively moved close to each other under a load of hot water poured onto the coffee powder supported by the filter 1 and thus the filter 1 is reliably prevented from falling off from the hanger 2.

For the invention, the filter body 4 and the flap sheets 6 may be made of any suitable sheets usually employed as material for filters such as woven fabric, nonwoven fabric or filter paper and these may be bonded to one another by use of adhesive or embossing. However, for the filter 1 destined to be used to make coffee or tea, it is preferred to use nonwoven fabric of heat-sealable synthetic fibers and to heat seal it in order to obtain the filter 1 in view of an apprehension that use of adhesive might deteriorate taste of coffee or tea. As an example of preferable nonwoven fabric is of a composite fiber comprising polyethylene and polypropyrene having a weight per unit area of 20–70g/m$^2$, more preferably of 30–50g/m$^2$. In this case, the filter 1 is suitable to be used as disposable filter, since such filter 1 is advantageous in strength, material cost and manufacturing cost.

While the filter 1 of the invention has been described hereinabove as used to make coffee, the filter 1 can find many other applications, for example, for scooping up bits of deep-fried Tempura batter from frying oil. According to the embodiment as shown, the pockets 8 are provided inside the filter 1 and, after the hanger 2 has been assembled into the filter 1, the filter 1 is turned over, from the view point that such procedure facilitates the hanger 2 to be inserted into the pockets 8. However, if such convenience is not required, the pockets 8 can be initially provided on the outer side of the filter 1. Moreover, while the filter body 4 substantially comprises a pair of original filter sheets and, according to the embodiment as shown, a single original filter sheet 21 being vertically symmetric with respect to the center line Z—Z is folded in two along the fold line 27, it is also possible to prepare separate sheets as the sections 21A, 21B of the original filter sheet 21, to lay these separate sheets one upon another and to bond them together along their portions corresponding to the center line Z—Z. It is also possible to configure the separately prepared sheets 21A, 21B so that the lower ends of side edges 22A, 23A as well as the lower ends of the side edges 22B, 23B intersect each other, respectively, i.e., a length of the zone corresponding to the center line Z—Z become zero. In this case, the filter 1 will present an inverted cone-shape and its end surface as viewed in a diametrical direction will be shaped an inverted triangle. While the flap sheets 6 are preferably of liquid-permeable filter sheets, they may be of liquid-impermeable sheets.

INDUSTRIAL UTILITY

The filter constructed as has been described above is used with the hanger comprising the annular portion having its diameter slightly smaller than that of the filter opening and the grip portion. Upon insertion of the annular portion into the pair of pockets formed on the outer side by the filter sheet and the flap sheets, the filter is hung down with its pockets being supported by the hanger and forms the bag having its end surface shaped in the inverted triangle or the trapezoid having its bottom side being shorter than its top side as viewed in the diametrical direction. The filter sheet and the flap sheets are relatively moved close to each other under a load of hot water poured into the filter and thereby reliably prevented from falling off from the hanger. When hot water is poured into the filter thus suspended by the hanger to make coffee, hot water is not easily cooled because there is neither cup nor any other means with which hot water is contact.

The filter of the invention can be also used to scoop up floating matter from liquid contained by a container.

The filter may be advantageously made of filter paper or nonwoven fabric to be used as disposable filter.

What is claimed is:

1. A filter comprising a pair of substantially identical filter sheets, each having a pair of upwardly diverging side edges and an arc-shaped upper end edge extending between ends of said side edges so as substantially to define a fan-shape, said pair of filter sheets being laid one upon another and bonded to each other at least in the proximity of said side edges so that said arc-shaped upper end edges may form a circular opening as the filter sheets are spaced from each other; and:

a pair of substantially crescent-shaped flap sheets bonded along arc-shaped edges thereof to the respective filter sheets to form a pair of pockets openable downward from said upper end edges.

2. A filter according to claim 1, wherein, in a collapsed state of said filter sheets prior to use, said pockets are formed on an inner side of said filter.

3. A filter according to claim 1, wherein said filter sheets and said flap sheets are made from nonwoven fabric of heat-sealable fibers and bonding of these members are achieved by heat-sealing said nonwoven fabric.

4. A filter according to claim 1, wherein said filter sheets are formed without any openings other than said circular opening.

5. A filter according to claim 1, wherein the upper edges only of the flap sheets are attached to said filter sheets.

6. A filter according to claim 1, wherein each flap sheet is coextensive with a major portion of the associated arc-shaped upper end edge.

7. A filter comprising a pair of filter sheets each having a pair of upwardly diverging side edges and an upper end edge extending between ends of said side edges, said pair of filter sheets being laid one upon another and bonded to each other at least in the proximity of said side edges so that said upper end edges may form an opening as the filter sheets are spaced from each other; and a pair of flap sheets respectively attached along at least one edge thereof to the respective filter sheets along said upper end edges to form a pair of pockets openable downward from said upper end edges, wherein, in a collapsed state of said filter sheets prior to use, said pockets are formed on a inner side of said filter;

wherein the upper edges only of the flap sheets are attached to said filter sheets.

8. A filter comprising a pair of filter sheets each having a pair of upwardly diverging side edges and an upper end edge extending between ends of said side edges, said pair of filter sheets being laid one upon another and bonded to each other at least in the proximity of said side edges so that said upper end edges may form an opening as the filter sheets are spaced from each other; and a pair of flap sheets respectively attached along at least one edge thereof to the respective filter sheets along said upper end edges to form a pair of pockets openable downward from said upper end edges, wherein each flap sheet is co-extensive with a major portion of said upper end edge of the associated filter sheet;

wherein the upper edges only of the flap sheets are attached to said filter sheets.

* * * * *